US009135679B2

(12) United States Patent
Choi et al.

(10) Patent No.: US 9,135,679 B2
(45) Date of Patent: Sep. 15, 2015

(54) APPARATUS AND METHOD FOR COLOR RESTORATION (71) Applicants: SAMSUNG TECHWIN CO., LTD., Changwon (KR); INDUSTRY-ACADEMIC COOPERATION FOUNDATION, YONSEI UNIVERSITY, Seoul (KR)

(72) Inventors: Eun-Cheol Choi, Changwon (KR); Moon-gi Kang, Seoul (KR); Hyun-mook Oh, Seoul (KR); Chul-Hee Park, Seoul (KR)

(73) Assignees: INDUSTRY-ACADEMIC COOPERATION FOUNDATION, YONSEI UNIVERSITY, Seoul (KR); Hanwha Techwin Co., Ltd., Changwon (KR)

(*) Notice: Subject to any disclaimer, the term of this patent is extended or adjusted under 35 U.S.C. 154(b) by 140 days.

(21) Appl. No.: 13/948,256

(22) Filed: Jul. 23, 2013

(65) Prior Publication Data
US 2014/0169671 A1    Jun. 19, 2014

(30) Foreign Application Priority Data

Dec. 14, 2012  (KR) .................. 10-2012-0146625

(51) Int. Cl.
*G06K 9/00* (2006.01)
*G06T 5/00* (2006.01)
(Continued)

(52) U.S. Cl.
CPC ............... *G06T 5/001* (2013.01); *G06T 5/009* (2013.01); *G06T 7/408* (2013.01); *H04N 5/332* (2013.01); *H04N 9/045* (2013.01); *H04N 9/67* (2013.01);
(Continued)

(58) Field of Classification Search
CPC ........... G06T 5/001; G06T 5/009; G06T 5/50; G06T 7/408; H04N 1/6008; H04N 5/332; H04N 9/045; H04N 9/67
USPC .................................................. 382/167, 274
See application file for complete search history.

(56) References Cited

U.S. PATENT DOCUMENTS 6,507,364 B1   1/2003  Bishay et al.
2007/0201738 A1*  8/2007  Toda et al. .................... 382/144
(Continued)

OTHER PUBLICATIONS

Borel et al. ("Novel methods for panchromatic sharpening of multi-hyper-spectral image data," IEEE International Conference on Geoscience and Remote Sensing Symposium, Jul. 12-17, 2009).*
Pattanaik, et al., "Adaptive Gain Control for High Dynamic Range Image Display", Published Thesis, total 7 pages, 2002.

*Primary Examiner* — Yubin Hung
(74) *Attorney, Agent, or Firm* — Sughrue Mion, PLLC (57) ABSTRACT

Provided is a method and apparatus for restoring color of an input image. The method includes: separating multiple band information of a near infrared (NIR) channel from information of the input image by using a correlation between a color channel and the NIR channel in the input image; obtaining estimated invisible light band information of the NIR channel from the multiple band information of the NIR channel and estimated multiple band information of the NIR channel which is estimated from the color channel; estimating invisible light band information of the color channel based on the estimated invisible light band information of the NIR channel; and restoring a visible light band image of the color channel by removing the estimated invisible light band information of the color channel from multiple band information of the color channel included in the information of the input image.

18 Claims, 9 Drawing Sheets (51) Int. Cl.
    *G06T 7/40*    (2006.01)
    *H04N 5/33*    (2006.01)
    *H04N 9/04*    (2006.01)
    *H04N 9/67*    (2006.01)
(52) U.S. Cl.
    CPC ............... *G06T 2207/10024* (2013.01); *G06T 2207/10048* (2013.01); *G06T 2207/20012* (2013.01)

(56) References Cited

U.S. PATENT DOCUMENTS

| | | | |
|---|---|---|---|
| 2008/0049115 A1* | 2/2008 | Ohyama et al. | 348/222.1 |
| 2009/0073262 A1* | 3/2009 | Fielding | 348/97 |
| 2010/0283866 A1* | 11/2010 | Numata | 348/223.1 |
| 2011/0216971 A1 | 9/2011 | Wang et al. | |
| 2013/0222603 A1* | 8/2013 | Agranov et al. | 348/164 |

* cited by examiner

Indoors (low CCT)

| | $\alpha_R$ | $\alpha_G$ | $\alpha_B$ |
|---|---|---|---|
| Set1 | 1.17605 | 0.612857 | 0.017811 |
| Set2 | 1.03614 | 0.539266 | 0.720084 |
| Set3 | 1.17802 | 0.613558 | 0.81892 |

| | $\alpha_R/\alpha_G$ | $\alpha_B/\alpha_G$ |
|---|---|---|
| | 1.918963 | 1.334424 |
| | 1.921389 | 1.335304 |
| | 1.919981 | 1.334707 |

400

Outdoors (high CCT)

| | $\alpha_R$ | $\alpha_G$ | $\alpha_B$ |
|---|---|---|---|
| Set1 | 1.23751 | 0.582772 | 0.81959 |
| Set2 | 0.883288 | 0.416675 | 0.583364 |
| Set3 | 1.25428 | 0.592343 | 0.829537 |

| | $\alpha_R/\alpha_G$ | $\alpha_B/\alpha_G$ |
|---|---|---|
| | 2.123489 | 1.406365 |
| | 2.119849 | 1.400046 |
| | 2.117489 | 1.400434 |

RGB channel NIR estimation $\hat{R}_{nir} = \alpha_R \cdot \hat{N}_{nir}$
$\hat{G}_{nir} = \alpha_G \cdot \hat{N}_{nir}$
$\hat{B}_{nir} = \alpha_B \cdot \hat{N}_{nir}$ $\alpha_R$

REFLECTION RATIO CURVE ACCORDING TO
N CHANNEL VALUES

APPARATUS AND METHOD FOR COLOR RESTORATION

CROSS-REFERENCE TO RELATED PATENT APPLICATION

This application claims priority from Korean Patent Application No. 10-2012-0146625, filed on Dec. 14, 2012, in the Korean Intellectual Property Office, the disclosure of which is incorporated herein in its entirety by reference.

BACKGROUND

1. Field

Apparatuses and methods consistent with exemplary embodiments relate to restoring color of an image obtained from a multi-spectral filter array (MFA).

2. Description of the Related Art

An image is obtained from a multi-spectral filter array (MFA) so as to simultaneously obtain natural color, detailed information regarding a near infrared (NIR) band, or improved sensitivity in a night environment.

To this end, resolution of each channel image should be improved and color thereof should be restored. In particular, color restoration in an MFA image processing operation should precede essentially. In this regard, research of converting an input image into a photo with a user's desired tone and atmosphere has proceeded. The purpose of this research is to pursue color transfer based on an analysis of characteristics of the input image and a target image. That is, a technique for pursuing color transfer by analyzing a statistical color distribution on each image based on similarity between two images (input image and target image) has been studied.

For example, there is a color transfer method in the same color space, like color transfer, whereby an image in a visible light band is transferred into another image in the visible light band. However, in the color transfer method, color is greatly damaged when color transfer is performed in different color spaces.

Also, when a signal-to-noise ratio (SNR) is considered in a color restoration process, there is a trade-off in which details of an image are damaged or color restoration performance is lowered. In detail, when the relative importance of the SNR is assumed to be higher than actuality, color restoration performance is maintained but the SNR is not maintained. Thus, components that damage low frequency signals may be generated in a flat region or details of high frequency signals may be damaged. Unlike this, when the relative importance of the SNR is assumed to be lower than actuality, the relative importance for performing the color restoration process decreases. Thus, there is a large tendency of maintaining original signal components and details of an input image and components of the flat region are well preserved, but a chroma of color is greatly lowered than actuality.

SUMMARY

One or more exemplary embodiments provide a method of restoring color of an image in an image fusion operation of fusing information regarding a visible light band and information regarding an invisible light band.

One or more exemplary embodiments also provide a method of restoring R, G, and B colors $R_{vis}$, $G_{vis}$, and $B_{vis}$ (the subscript "vis" is a visible light band image) from R, G, B, and N images $R_{all}$, $G_{all}$, $B_{all}$, and $N_{all}$ (the subscript "all" is an all band image including a visible light band and an invisible light band) that are obtained from a multi-spectral filter array (MFA) without using an additional physical filter.

One or more exemplary embodiments also provide a method of restoring a color of an image, whereby a difference between color spaces that occurs when color transfer is performed in different color spaces, like in an operation of moving a color space of a sensor in which a visible light band and an invisible light band can be simultaneously obtained, to a color space of a sensor in which only the visible light band can be obtained may be overcome.

One or more exemplary embodiments also provide a method of restoring color of an image by using adaptive color coefficients so as to improve a color restoration performance and to prevent damage to details of the image even when a signal-to-noise ratio (SNR) is considered.

According to an aspect, there is provided a color restoration method including: separating multiple band information of a near infrared (NIR) channel from information of an input image by using a correlation between a color channel and the NIR channel in the input image; obtaining estimated invisible light band information of the NIR channel from the multiple band information of the NIR channel and estimated multiple band information of the NIR channel which is estimated from the color channel; estimating invisible light band information of the color channel based on the estimated invisible light band information of the NIR channel; and restoring a visible light band image of the color channel by removing the estimated invisible light band information of the color channel from multiple band information of the color channel included in the information of the input image.

The correlation between the color channel and the NIR channel may be indicated by the following equation:

$$\begin{pmatrix} R_v \\ G_v \\ B_v \end{pmatrix} = \begin{pmatrix} R \\ G \\ B \end{pmatrix} - K \begin{pmatrix} \alpha_r(c) & 0 & 0 \\ 0 & \alpha_g(c) & 0 \\ 0 & 0 & \alpha_b(c) \end{pmatrix} \begin{pmatrix} -\tilde{\omega}_r & -\tilde{\omega}_g & -\tilde{\omega}_b & 1 \\ -\tilde{\omega}_r & -\tilde{\omega}_g & -\tilde{\omega}_b & 1 \\ -\tilde{\omega}_r & -\tilde{\omega}_g & -\tilde{\omega}_b & 1 \end{pmatrix} \begin{pmatrix} R \\ G \\ B \\ N \end{pmatrix},$$

where $\alpha_r(c)$, $\alpha_g(c)$, and $\alpha_b(c)$ are adaptive chromaticity coefficients selected for a case in which a difference between actual visible light band information and estimated visible light band information of the input image is the smallest, c is a chromaticity component of a pixel, K is a constant, and $\tilde{\omega}_r$, $\tilde{\omega}_g$, and $\tilde{\omega}_b$ are estimated values that indicate a correlation between R, G, and B channels and the NIR channel in the visible light band in consideration of a noise value.

The method may further include: calculating a difference between visible light band information and estimated visible light band information of an input image, wherein the separating the multiple band information of the NIR channel from the input image is performed based on a case in which the difference is the smallest.

The method may further include: obtaining adaptive chromaticity coefficients for the case in which the difference is the smallest; and suppressing interference between the color channel and the NIR channel using the adaptive chromaticity coefficients.

According to another aspect, there is provided a color restoration apparatus including: a channel correlation checking unit configured to separate multiple band information of a near infrared (NIR) channel from information of an input image by using a correlation between a color channel and the NIR channel in the input image; an adaptive gain control (AGC) unit configured to obtain estimated invisible light band information of the NIR channel from the multiple band information of the NIR channel and estimated multiple band information of the NIR channel which is estimated from the color channel; and a visible light band information restoring unit configured to estimate invisible light band information of the color channel based on the estimated invisible light band information of the NIR channel, and restore a visible light band image of the color channel by removing the estimated invisible light band information of the color channel from multiple band information of the color channel included in the information of the input image.

The AGC unit may be configured to obtain the invisible light band information of the NIR channel by using an equation $\lambda K(N_{all} - r\hat{N}_{all}) = \hat{N}_{nir}$, where $$\lambda = \frac{\frac{1}{r} \times \hat{N}_{nir}}{\left(\frac{1}{r} - 1\right) \times N_{all} \times K + \hat{N}_{nir}},$$

wherein $N_{all}$ is the multiple band information of the NIR channel, $\hat{N}_{all}$ is the estimated multiple band information estimated from the color channel, and r is a constant greater than 0 and smaller than 1, and K is another constant. Equation 12:

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

The terms used herein are used to describe exemplary embodiments of the present inventive concept, and not to limit the present inventive concept. A singular form may include a plural form, unless otherwise defined. The term "comprise" and/or "comprising" specify the existence of mentioned shapes, numbers, steps, operations, elements, parts, and/or groups thereof, and do not exclude existence or addition of at least one of other shapes, numbers, steps, operations, elements, parts, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
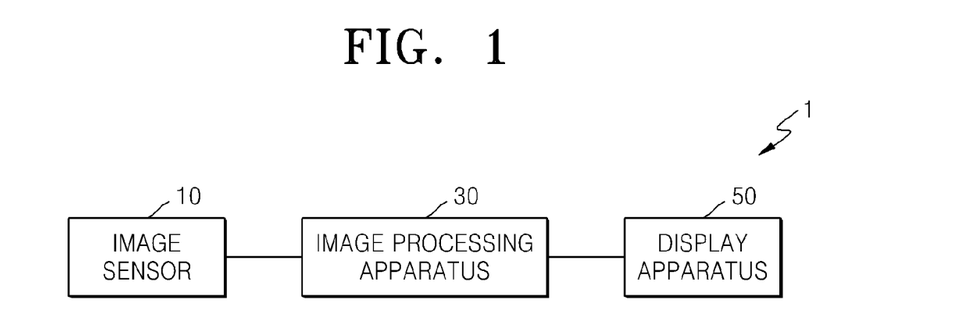
FIG. 1 is a schematic block diagram of a camera system according to an exemplary embodiment.

FIG. 1 is a schematic block diagram of a camera system 1 according to an exemplary embodiment.

The present invention may be applied to a digital camera system using a sensor having an RGB+NIR structure.

Referring to FIG. 1, the camera system 1 includes an image sensor 10, an image processing apparatus 30, and a display apparatus 50. The camera system 1 may be an image capturing system, such as a digital camera, a camcorder, or a surveillance camera and may also be mounted on a computer, a personal digital assistant (PDA), a portable multimedia player (PMP), or a mobile phone.

The image sensor 10 uses a photoelectric transformation device, such as a charge-coupled device (CCD) or a complementary metal oxide semiconductor (CMOS) imaging sensor. The image sensor 10 includes a pixel array in which a plurality of pixels transform an optical signal into an electric image signal by using the photoelectric transformation device.

A multi-spectral filter array (MFA) through which visible light and invisible light pass is disposed on the image sensor 10. The MFA includes color filters RCF, GCF, and BCF and a near infrared filter (NIRF), wherein the color filters RCF, GCF, and BCF allow components of lights, such as R, G, and B lights in a visible light band in the range of 400 to 700 nm of an visible band to pass through the color filters RCF, GCF, and BCF, and the NIRF allows light components in an NIR region in the range of 700 to 1100 nm of an invisible band to pass through the NIRF.

The color filters RCF, GCF, and BCF and the NIRF of the MFA are arranged to correspond to the number of respective pixels of the image sensor 10, and the respective pixels of the image sensor 10 detect color channel signals R, G, and B and an NIR channel signal (hereinafter, referred to as "N"). A lens (not shown) that receives an optical signal may be disposed on a front end of the image sensor 10.

[Color Distribution Limitation According to Lighting Environment]

In the color channel signals R, G, and B and the NIR channel signal N that pass through the MFA, information regarding a spectrum band of one channel among the four channels may not be separated from information regarding a spectrum band of another channel among the four channels. Instead, information regarding different spectrum bands of channels may be simultaneously obtained.

In detail, when an NIR band is restricted and only information regarding the visible light band is obtained, the color channels obtain information regarding respective three wavelength (or spectrum) bands corresponding to RGB, and thus, colors may be distinguished based on information regarding the three wavelength bands. That is, when only information regarding the visible light band is received using an infrared cut-off filter (IRCF), information and color that are the same as those recognized by the human eye may be distinguished.

However, when information regarding the NIR band is received in each color channel without any limitation, each color channel obtains the information regarding the NIR band, and thus, it is difficult to obtain information regarding an independent wavelength band of each color channel.

In particular, when an image in a visible light band and an image in the NIR band are mixed with each other by not having or removing the IRCF, the entire color of the visible light band may be changed differently from its original color.

In relation to color contrast, input wavelengths of channels are nearly uniformly distributed in a visible light band of 400 to 700 nm regardless of the presence of the IRCF but they are differently distributed in a band of 700 nm or more depending on the presence of the IRCF.

In detail, the bandwidth of an R channel in the range of 550 to 700 nm increases from 550 to 1100 nm so that the red color increases definitely in an image from which the IRCF is removed. Also, wavelength distribution of G and B channels varies nonlinearly in a band of 700 nm or more. In addition, inputs of R, G, and B channels are similar in a band of 900 nm or more so that light received in this band has an achromatic color. As a result, if information regarding the NIR band are added to each color channel, similarity between the R, G, and B channels increases so that contrast between colors is limited.

In a lighting environment, such as solar light or fluorescent light, in which relative importance of the NIR band is relatively smaller than that of the visible light band, influence of the NIR band is not large. However, in a lighting environment, such as an incandescent lamp or a halogen lamp, in which relative importance of the NIR band is larger than that of the visible light band, information regarding the NIR band affects color acquisition, compared to color information regarding the visible light band. As a result, color distribution may be limited according to a lighting environment.

[Color Restoration in Consideration of Correlation Between Channels]

According to an exemplary embodiment, a color restoration method for solving a problem related to color damage that occurs when a color space of a multi-band filter sensor in which a visible light band and an invisible light band can be simultaneously obtained is moved to a color space of a sensor in which only the visible light band can be obtained is suggested.

When an image is obtained using the multi-band filter sensor, an NIR channel is obtained together with three R, G, and B channels, as may be expressed as Equations 1a to 1d:

$$R_{all} = R_{vis} + R_{nir} \quad (1a)$$

$$G_{all} = G_{vis} + G_{nir} \quad (1b)$$

$$B_{all} = B_{vis} + B_{nir} \quad (1c)$$

$$N_{all} = N_{vis} + N_{nir} \quad (1d)$$

The wavelength band range of $R_{all}$, $G_{all}$, $B_{all}$, and $N_{all}$ that are obtained using the multi-band filter sensor shown in Equation 1 is between 400 and 1100 nm, and pieces of NIR information are obtained in addition to visible light band information.

In this case, an intensity of a pixel may be obtained from each channel according to a wavelength band, as shown in Equation 2:

$$C = C_{vis} + C_{nir} \quad (2),$$

where C represents an intensity of a pixel obtained by the multi-band filter sensor. The intensity of a pixel may also be obtained by following Equation 3.

In Equation 3, an image, in which only the visible light band is received, may be expressed by using the IRCF as a function with respect to a light source $I(\lambda)$, reflectivity $\rho(\lambda)$, and sensitivity $S(\lambda)$ of a sensor.

$$C(i,j) = \int_{400}^{1100} I(\lambda)\rho_c(\lambda)S(i,j,\lambda)d\lambda \quad (3)$$

$$= \int_{400}^{700} I(\lambda)\rho_c(\lambda)S(i,j,\lambda)d\lambda$$

$$+ \int_{700}^{1100} I(\lambda)\rho_c(\lambda)S(i,j,\lambda)d\lambda$$

$$= C_{vis}(i,j) + C_{nir}(i,j)$$

In Equations 2 and 3, $C_{vis}$ and $C_{nir}$ represent an intensity of the visible light band and an intensity of the invisible light band, respectively. That is, when a filter sensor including fused NIR information is used, the intensity of the visible light band and the intensity of the invisible light band may be expressed as a linear sum of visible light band information and invisible light band information.

Thus, ideally, a natural color of the visible light band may be obtained by removing only the invisible light band information from the whole band information. Thus, ideally, a natural color of the visible light band may be obtained by removing only the invisible light band information from the whole band information. That is, color of the visible light band may be obtained by estimating $N_{nir}$ from $R_{all}$, $G_{all}$, $B_{all}$, and $N_{all}$, generating $R_{nir}$, $G_{nir}$, and $B_{nir}$ from the estimated $N_{nir}$, and removing $R_{nir}$, $G_{nir}$, and $B_{nir}$ from $R_{all}$, $G_{all}$, and $B_{all}$ by using Equation 1.

That is, in the current embodiment, color of the visible light band may be obtained by removing $R_{nir}$, $G_{nir}$, and $B_{nir}$ from $R_{all}$, $G_{all}$, and $B_{all}$ after removing $N_{all}$ from an image signal composed With $R_{all}$, $G_{all}$, $B_{all}$, and $N_{all}$.

To this end, in the current embodiment, a correlation between wavelength bands in the visible light band and a correlation between wavelength bands in the NIR band are used, as shown in Equations 4a to 4c.

$$N_{all}(i,j) = N_{vis}(i,j) + N_{nir}(i,j) \quad (4a)$$

$$N_{vis}(i,j) = a_{v,r}(i,j) \times R_{vis}(i,j) + a_{v,g}(i,j) \times G_{vis}(i,j) + a_{v,b}(i,j) \times B_{vis}(i,j) \quad (4b)$$

$$N_{nir}(i,j) = a_{n,r}(i,j) \times R_{nir}(i,j) + a_{n,g}(i,j) \times G_{nir}(i,j) + a_{n,b}(i,j) \times B_{nir}(i,j) \quad (4c)$$

In Equations 4a to 4c, $a_{v,r}$, $a_{v,g}$, and $a_{v,b}$ are variables that indicate a correlation between R, G, and B channels and the N channel in the visible light band, and $a_{n,r}$, $a_{n,g}$, and $\alpha_{n,b}$ are variables that indicate a correlation between the R, G, and B channels and the N channel in the NIR band. The N channel may be referred to as an NIR channel. In the descriptions herein, however, the N channel is used in lieu of the NIR channel.

Figure 2A:
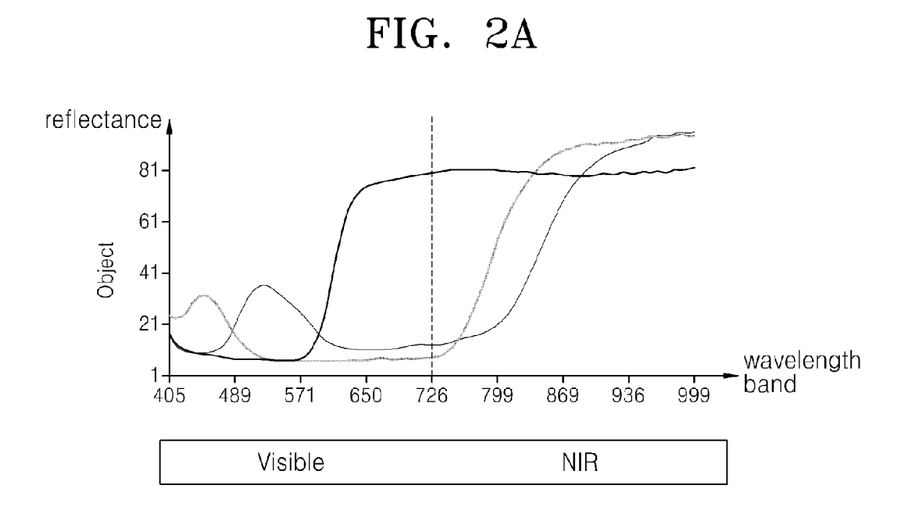
FIGS. 2A and 2B illustrate an example of spectrum distribution of an ideal filter.

As illustrated in FIG. 2A, in a spectrum distribution of an ideal filter, only NIR band information may be obtained at the N channel. Thus, color restoration of the R, G, and B channels may be performed using a relationship between these channels.

Figure 2B:
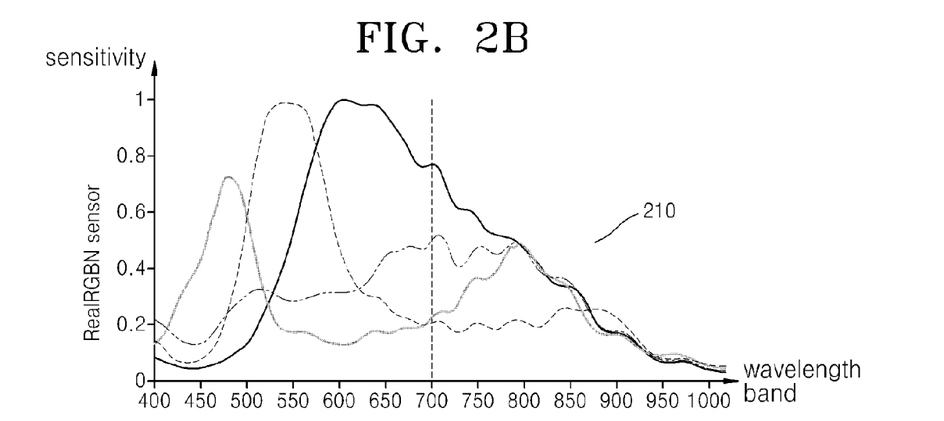

However, as illustrated in FIG. 2B, in a spectrum distribution of an actual filter, information regarding the visible light band in addition to information regarding the NIR band may be obtained at the N channel. Thus, as shown in Equation 4, information regarding the visible light band and information regarding the NIR band may be distinguished from each other at the N channel. A correlation between a spectrum of the R, G, and B channels and a spectrum of the N channel may be represented using Equation 4.

According to another exemplary embodiment, Equation 4 may be differently represented as shown in Equation 5 under two assumptions:

Firstly, it is assumed that a pixel position of a filter does not affect a spectrum relationship between channels. That is, it is assumed that physical characteristics are the same in the whole pixel position of the filter. Secondly, it is assumed that a correlation between the R, G, and B channels and the N channel in the visible light band and a correlation between the R, G, and B channels and the N channel in the NIR band are similar to each other. Equation 5 is as follows:

$$N_{all}=N_{vis}+N_{nir}j=\omega_r(R_{vis}+a_{v,n}\times R_{nir})+\omega_g(G_{vis}+a_{v,n}\times G_{nir})+\omega_b(R_{vis}+a_{v,n}\times R_{nir}) \quad (5)$$

In Equation 5, $\omega_r$, $\omega_g$, and $\omega_b$ are variables that indicate a correlation between the R, G, and B channels and the N channel in the visible light band, and $a_{v,n}$ is a variable that supplements different relative importance between the R, G, and B channels and the N channel in the NIR band.

In the current embodiment, $N_{all}$ is removed from an image signal composed with $R_{all}$, $G_{all}$, $B_{all}$, and $N_{all}$. Then, color of the visible light band is obtained by removing $R_{nir}$, $G_{nir}$, and $B_{nir}$ from $R_{all}$, $G_{all}$, and $B_{all}$. To remove $R_{nir}$, $G_{nir}$ and $B_{nir}$ from $R_{all}$, $G_{all}$, and $B_{all}$, NIR band information $N_{nir}$ is separated out from an $N_{all}$ channel, and thereafter NIR band information $R\hat{}_{nir}$, $G\hat{}_{nir}$, and $B_{nir}$ is estimated from the R, G, and B channels based on the separated $N\hat{}_{nir}$. Here, the separated $N\hat{}_{nir}$ is not an exact value but indicates a value estimated by calculation. (see FIGS. 3 and 4).

In the current embodiment, Equations 10 through 12 may be used to calculate $N\hat{}_{nir}$.

Figure 3:
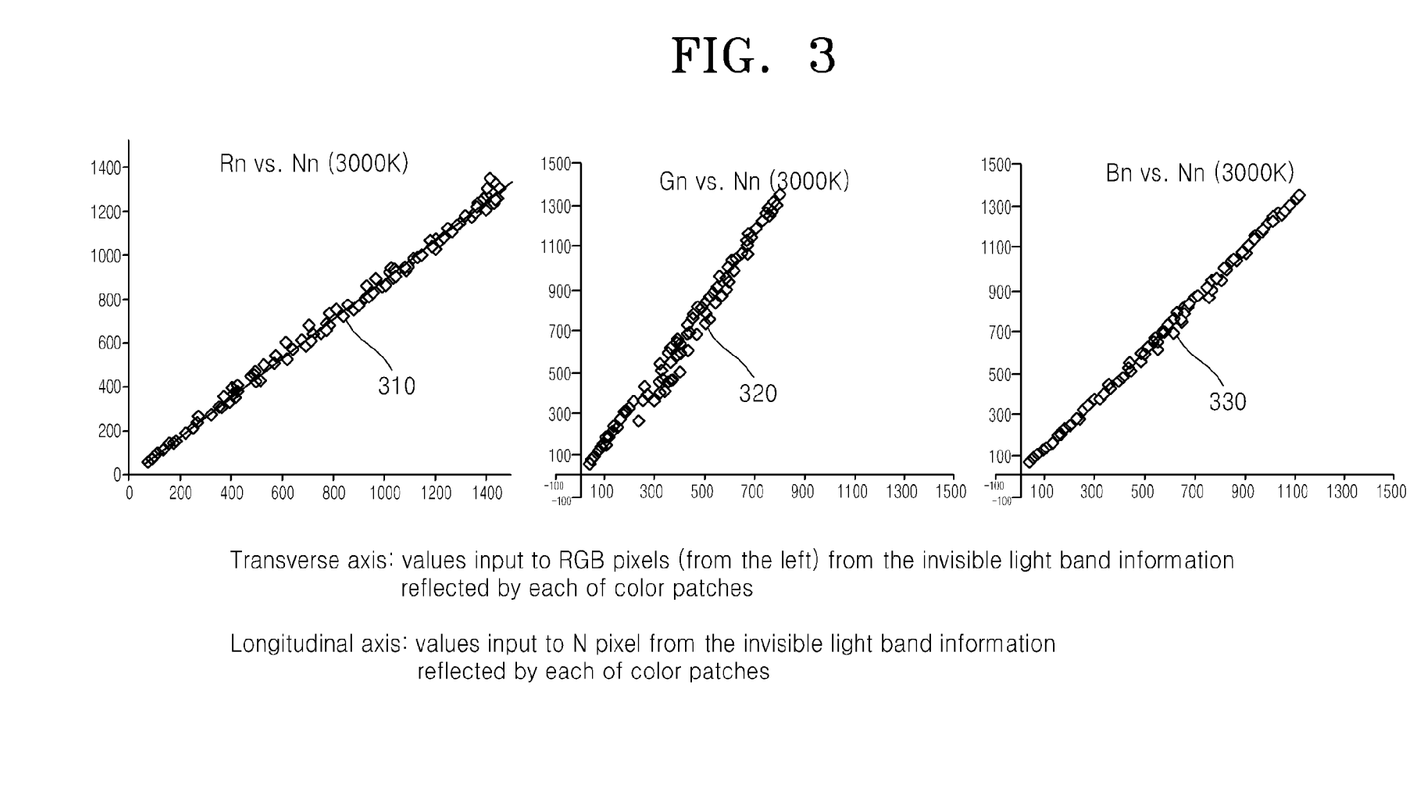
FIG. 3 illustrates graphs showing a correlation between R, G, and B channels and an N channel, according to an exemplary embodiment.

FIG. 3 illustrates graphs showing a correlation between the R, G, and B channels and the N channel.

As shown in FIG. 3, the N channel has different correlations between each of the R, G, and B channels. However, the N channel has linear correlations 310, 320, and 330 between each of the R, G, and B channels.

Figure 4:
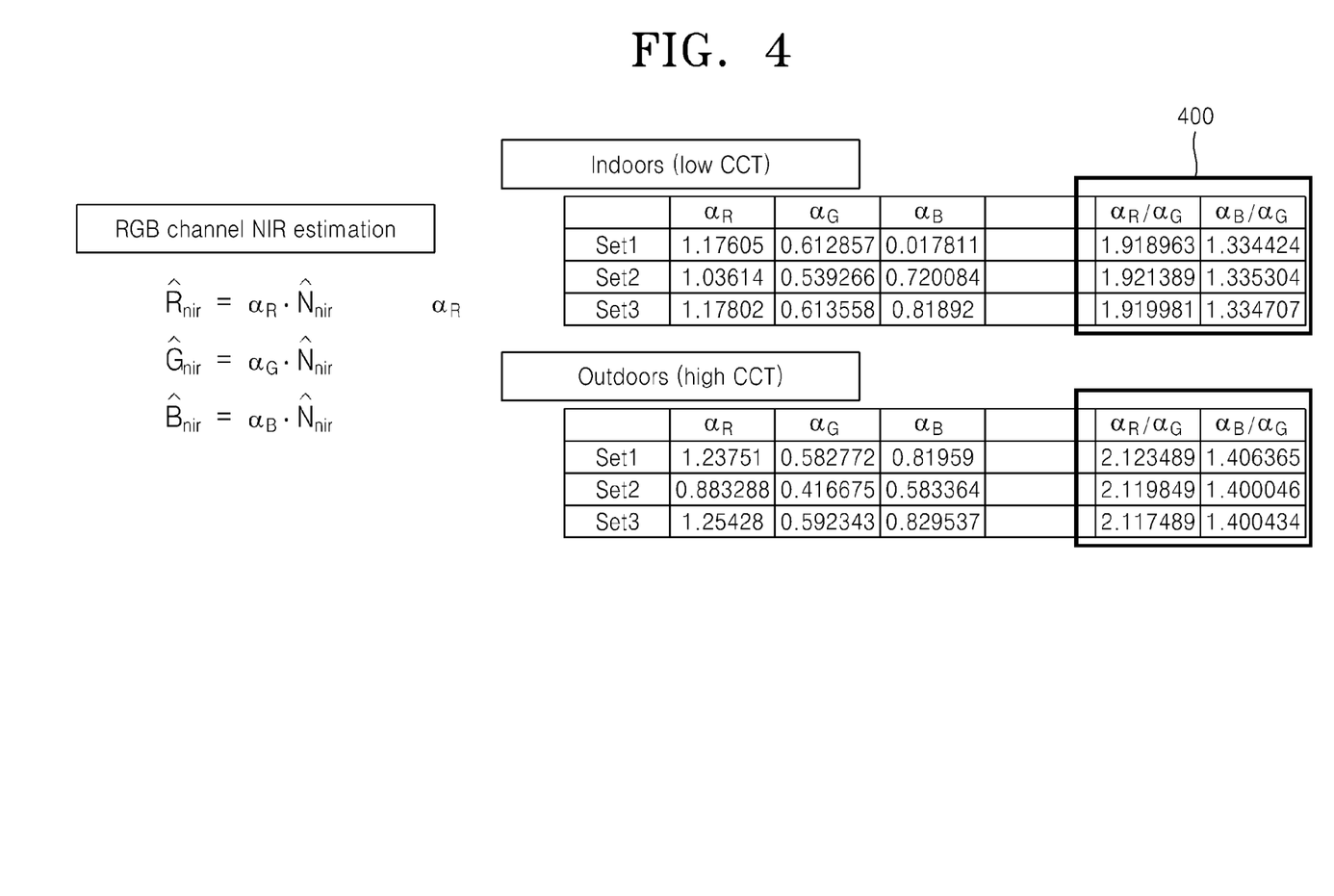
FIG. 4 illustrates an example in which coefficients that indicate that linear correlations between the N channel and the R, G, and B channels are obtained, according to an exemplary embodiment.

FIG. 4 illustrates an example in which coefficients that indicate that linear correlations between the N channel and the R, G, and B channels are obtained.

In FIG. 4, Set1 and Set2 represent final coefficients $\alpha_R$, $\alpha_G$, and $\alpha_B$ that are obtained at the N channel before and after a noise level is considered. Set3 represents final coefficients $\alpha_R$, $\alpha_G$, and $\alpha_B$ by using the N channel that is obtained using a physical filter in an ideal situation.

In this case, the respective coefficients have different characteristics but a ratio of coefficients of the R, G, and B channels, i.e., a ratio of values of the R, G, and B channels in the NIR band may be constantly maintained (400). When coefficients are obtained from an outdoor image by using the same method, gradients related to the linear correlations are different but the ratio of coefficients of the R, G, and B channels may be constantly maintained regardless of a method (410).

As illustrated in FIGS. 3 and 4, a method of restoring color of a visible light band image based on the correlation between the R, G, and B channels and the N channel is shown in Equation 6.

$$\begin{pmatrix} R_v \\ G_v \\ B_v \end{pmatrix} = \begin{pmatrix} R \\ G \\ B \end{pmatrix} - K \begin{pmatrix} \alpha_r & 0 & 0 \\ 0 & \alpha_g & 0 \\ 0 & 0 & \alpha_b \end{pmatrix} \begin{pmatrix} -\omega_r & -\omega_g & -\omega_b & 1 \\ -\omega_r & -\omega_g & -\omega_b & 1 \\ -\omega_r & -\omega_g & -\omega_b & 1 \end{pmatrix} \begin{pmatrix} R \\ G \\ B \\ N \end{pmatrix} \quad (6)$$

In Equation 6, K is a constant that is defined as $a_{v,n}/(a_{v,n}-1)$, and $\alpha_r$, $\alpha_g$, and $\alpha_b$ are variables that indicate the ratio of the N channel with respect to the R, G, and B channels in the NIR band. $\omega_r$, $\omega_g$, and $\omega_b$ are variables that indicate the correlation between the R, G, and B channels and the N channel in the visible light band.

[Suppression of Interference Between Channels and Color Restoration]

Equations 1 through 6 are based on a concept that, ideally, natural color of the visible light band may be obtained by removing only the NIR band information from the whole band information.

However, noise components other than the visible light band information and the NIR band information are obtained from an actual input image. For example, there is noise caused by nonuniform sensitivity of a sensor and noise caused by heat. When color restoration is performed without considering this, noise that is not highlighted in an actual signal, is highlighted.

Thus, when color restoration is performed by removing only the NIR band information from the whole band information, in actuality, relative importance of signal components decreases, whereas the noise components increase in a color restoration process or are added due to an error of color restoration, so that a signal-to-noise ratio (SNR) may be greatly lowered. In particular, this phenomenon may occur greatly in a light source, such as an incandescent lamp in which the relative importance of energy of the NIR band is larger than that of the visible light band.

When it is assumed that an image obtained from an incandescent light source is as an SNR normal input condition, if a lower SNR than actuality is considered in an input image, color restoration performance is lowered and a large amount of NIR band components remain. Contrary to this, when a higher SNR than actuality is considered in the input image, NIR band components are removed well, and color restoration performance increases but an error of color restoration in a flat region may be amplified.

As a result, an error of color restoration is amplified, compared to a color restoration method based on the correlation between the R, G, and B channels and the N channel, as shown in Equations 1 through 6. In particular, an error of coefficients (K, $\omega_r$, $\omega_g$, and $\omega_b$ of Equation 6) for N channel spectrum separation is amplified.

Thus, in an exemplary embodiment, a color restoration method is suggested, whereby color restoration performance may be improved even when the SNR is considered, damage to details of an image may be prevented, and amplification of an error that occurs when an N channel estimation process is performed may be prevented.

Figure 5:
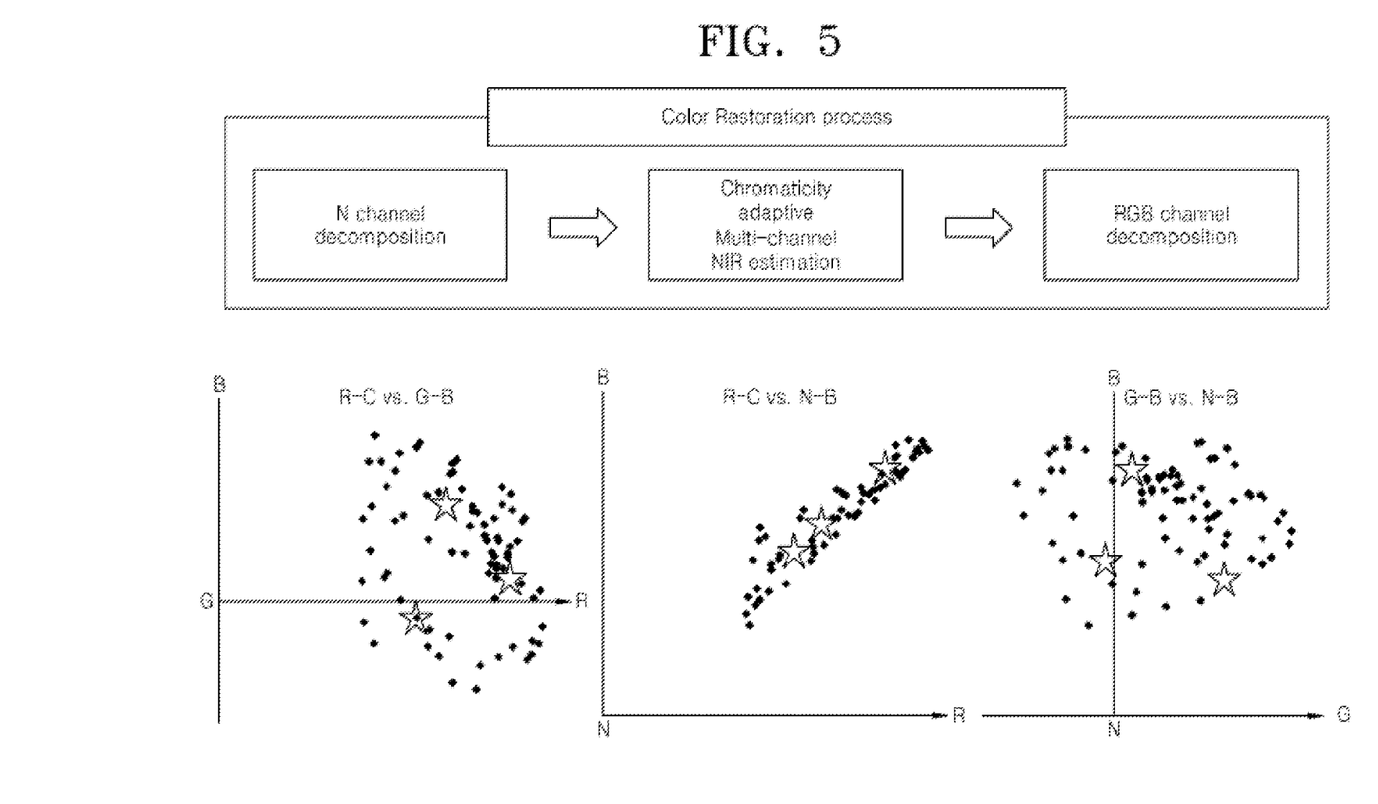
FIG. 5 illustrates an embodiment in which color coefficients are adaptively estimated, according to an exemplary embodiment.

To this end, in the current embodiment, chromaticity adaptive coefficients are used in color restoration. FIG. 5 illustrates an embodiment in which color coefficients are adaptively estimated.

Three-dimensional RGB color signals are generally analyzed using a method of analyzing distribution of color patches on chromaticity signals by using a two-dimensional chromaticity signal plane. In this case, a normalized chromaticity signal plane shown in FIG. 5 is used to remove the influence on intensity.

K groups having a minimum error may be determined using a k-means clustering method according to color based on the above method, and a center of the K groups may be obtained on the chromaticity signal plane. The k-means clustering method is a method of setting a plurality of groups based on a correlation between given data, whereby an optimum group center having a minimum error is found by performing iteration on k arbitrary centers.

Referring to FIG. 5, three groups of representative colors may be determined from chromaticity signal planes shown as R-C vs. G-B, R-C vs. N-B, and G-B vs. N-B to obtain the center of the groups. A distance between a position where an input arbitrary color is disposed and three representative color groups is calculated as a weight to obtain a compensated color.

However, since color samples on a given color chart do not include all colors when an error between color patches is obtained, an unbalance between the generated groups may occur. That is, when the number of red samples is large, groups related to red color increase. As a result, other colors may not be well considered.

In order to supplement this, according to an exemplary embodiment, an error estimation method based on linear regression, as shown in Equations 7a and 7b, is used.

$$A_k = \underset{A}{\mathrm{argmin}} \sum_{i=1}^{K} W_i \|X_i - A_k y_i\|^2 \quad (7a)$$

$$A_k = [\alpha_{r,k}, \alpha_{g,k}, \alpha_{b,k}]^T \quad (7b)$$

In Equations 7a and 7b, $A_k$, in which a difference between information (for example, $R_{vis}$) regarding the actual visible light band and information $\hat{R}_{vis}$ regarding estimated visible light band is the smallest, is found.

In the current embodiment, grouping of color samples is performed on an image captured in a given lighting environment. As a result, if the center of groups and a transformation matrix of each group are obtained, color-adaptive color restoration is performed on an arbitrary image in the same lighting environment.

That is, when a transformation matrix regarding each group is $A_k$, a transformation matrix with respect to an arbitrary color is obtained by using Equation 8. In this case, a weight with respect to each group is defined in inverse proportion to a distance on the chromaticity signal plane.

$$A = \frac{1}{\sum_{k=1}^{K} \bar{\omega}_k} [\bar{\omega}_1 \cdot A_1 + \bar{\omega}_2 \cdot A_2 + \ldots + \bar{\omega}_K \cdot A_K] \quad (8)$$

In Equation 8, $A_k$ is a transformation matrix with respect to each group, and $\bar{\omega}_K$ is a weight with respect to each group.

As a result, a color restoration matrix may be set, as shown in Equation 9.

$$\begin{pmatrix} R_v \\ G_v \\ B_v \end{pmatrix} = \begin{pmatrix} R \\ G \\ B \end{pmatrix} - K \begin{pmatrix} \alpha_r(c) & 0 & 0 \\ 0 & \alpha_g(c) & 0 \\ 0 & 0 & \alpha_b(c) \end{pmatrix} \begin{pmatrix} -\tilde{\omega}_r & -\tilde{\omega}_g & -\tilde{\omega}_b & 1 \\ -\tilde{\omega}_r & -\tilde{\omega}_g & -\tilde{\omega}_b & 1 \\ -\tilde{\omega}_r & -\tilde{\omega}_g & -\tilde{\omega}_b & 1 \end{pmatrix} \begin{pmatrix} R \\ G \\ B \\ N \end{pmatrix} \quad (9)$$

The information $\hat{R}_{vis}$, represented $R_v$ in Equation 9, regarding the estimated visible light band is obtained through Equation 9 by subtracting a value, which is calculated by multiplying input images RGBN by coefficients decrypted in Equation 9 (K, α, $\bar{\omega}$) and summing the multiplied values, from the input image RGB.

$\alpha_r(c)$, $\alpha_g(c)$, and $\alpha_b(c)$ are coefficients that indicate a correlation between the R, G, and B channels and the N channel in the NIR band that vary adaptively according to chromaticity components, and c represents chromaticity components of a pixel.

The coefficients $\alpha_r(c)$, $\alpha_g(c)$, and $\alpha_b(c)$ of Equation 9 may be expressed in the form of a function with respect to chromaticity components, may be obtained by $A_k(A_K=[\alpha_{r,k}, \alpha_{g,k}, \alpha_{b,k}]^T)$ in which a difference between information (for example, $R_{vis}$) regarding the actual visible light band and information $\hat{R}_{vis}$ regarding the estimated visible light band is the smallest, and vary adaptively according to color.

$\tilde{\omega}_r$, $\tilde{\omega}_g$, and $\tilde{\omega}_b$ are coefficients that are estimated from $\omega_r$, $\omega_g$, and $\omega_b$ of Equation 6 in consideration of a noise level. These coefficients are comprised of sets that are selected according to an SNR level of an input image.

[Color Restoration to Prevent Increase in Error of Input Image]

As described with reference to Equations 7a through 9, even when color is restored by suppressing interference between channels adaptively according to color based on error estimation based on chromaticity adaptive coefficients and linear regression, if the relative importance of the NIR band information is large, details of an image may be damaged.

Figure 6:
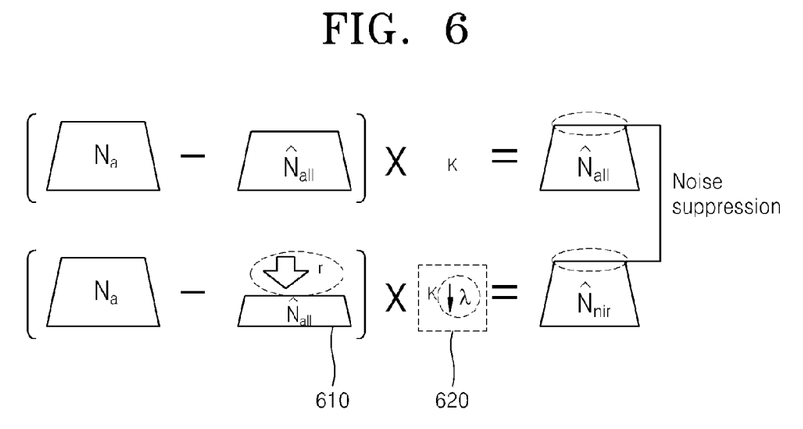
FIG. 6 illustrates the concept of adaptive gain control (AGC) for preventing damage to details of an image, even when the relative importance of near infrared (NIR) band information is large, according to an exemplary embodiment.

FIG. 6 illustrates a concept of adaptive gain control (AGC) for preventing damage to details of an image, even when the relative importance of NIR band information is large, according to an exemplary embodiment.

As shown below in Equation 10, NIR components $\hat{N}_{nir}$ that are estimated by multiplying a difference between NIR all band information $N_{all}$ of an input N channel and NIR all band information $\hat{N}_{all}$ of the input N channel estimated from R, G, and B channels by a coefficient K (where K is a constant) are inferred.

$$K(N_{all} - \hat{N}_{all}) = \hat{N}_{nir} \quad (10)$$

Here, all band information includes information of visible band and information of invisible band.

In Equation 10, $\hat{N}_{all}$ may correspond to a value obtained by calculating $\omega_r R_{all} + \omega_g G_{all} + \omega_b B_{all} \cdot \omega_{r-\omega g}$, and $\omega_h$, are coefficients to obtain $R_{vis}$, $G_{vis}$ and $B_{vis}$ in the visible light band as shown in Equations 6 and 9. When noise is not considered, Equation 6 may be used, and when noise is considered, Equation 9 may be used.

In this procedure, the noise components that occur due to the difference between $N_{all}$ and $\hat{N}_{all}$ may be amplified while they are multiplied by K. Thus, an SNR having low estimated NIR components is generated, which causes an error in a further NIR decomposition process.

In particular, K causes a value $(N_{all} - \hat{N}_{all})$ to be amplified. In Equation 10, K is a constant, and thus, amplification is applied to the whole image.

Thus, according to an exemplary embodiment, the SNR of the value $(N_{all} - \hat{N}_{all})$ may be increased by reducing $\hat{N}_{all}$ (r x $\hat{N}_{all}$)(610). Here, r is a value greater than 0 and smaller than 1. However, in this case, if the value K does not vary, the estimated value $\hat{N}_{nir}$ of the NIR image becomes different from a value in case where estimation is performed by using Equation 10. Thus, as shown in Equations 11 and 12 below, a value γ for adjusting the value K is added (620). As a result, in Equations 11 and 12, γ is a variable (not a constant).

$$\lambda K(N_{all} - r\hat{N}_{all}) = \hat{N}_{nir} \quad (11)$$

$$\lambda = \frac{\frac{1}{r} \times \hat{N}_{nir}}{\left(\frac{1}{r} - 1\right) \times N_{all} \times K + \hat{N}_{nir}} \quad (12)$$

$N\hat{}_{nir}$ in Equation 12 uses a value obtained in Equation 10. That is, in Equation 11, λ is calculated in Equation 12 based on $N\hat{}_{nir}$ obtained in Equation 10 so that a new value $N\hat{}_{nir}$ may be regenerated. $N\hat{}_{nir}$ that is regenerated in Equation 11 by using r and λ may maintain a high SNR while maintaining the whole intensity.

Figure 7:
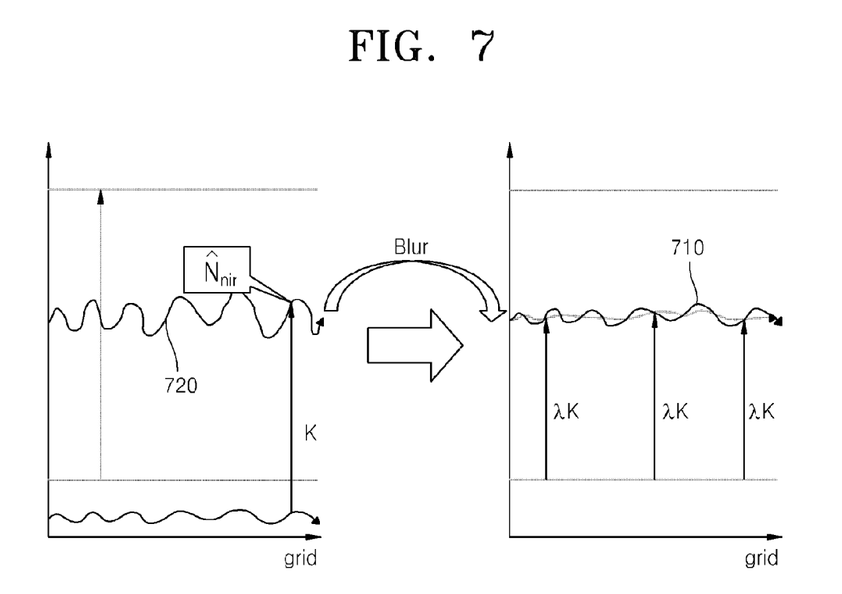
FIG. 7 illustrates an embodiment in which r of Equation 12 is set to 4 and a uniform mask is used in blur, according to an exemplary embodiment.

When Equation 12 applies using the blurred image $N\hat{}_{nir}$, noise components of the image $N\hat{}_{nir}$ are suppressed, and the image $N\hat{}_{nir}$ follows a pattern of the input image $N_{all}$ (710), as shown in FIG. 7.

In FIG. 7, when Equation 11 is applied to $N\hat{}_{nir}$ (720), a result (720) in which the noise components of the image $N\hat{}_{nir}$ are suppressed may be obtained. FIG. 7 illustrates an exemplary embodiment in which r of Equation 12 is set to 4 and a uniform mask is used in blurring. The blurring may be performed to obtain an average pixel value. For the purpose of the blurring, values of all the pixels in an n by n mask may be added and the divided by $n^2$.

[Color Restoration in Consideration of Saturation Phenomenon]

Figure 8:
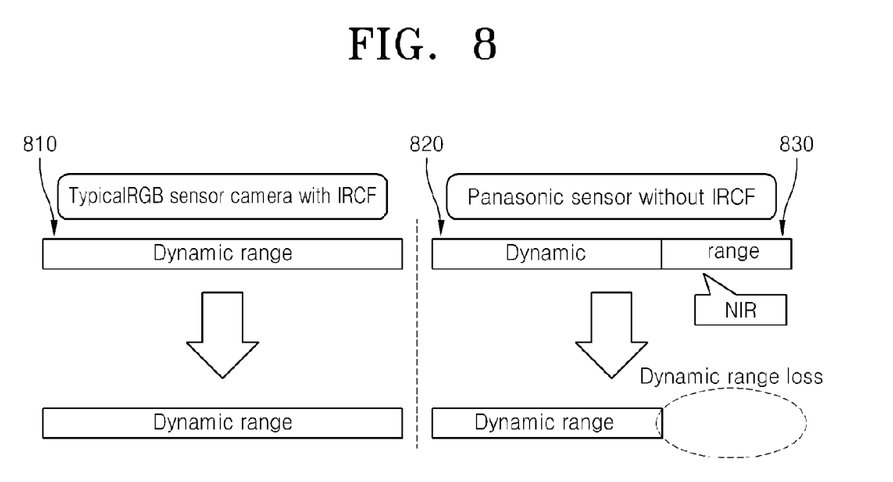
FIG. 8 illustrates an example of damage in a color restoration process when an RGBN sensor is used, according to an exemplary embodiment.

FIG. 8 illustrates an example of damage in a color restoration process when an RGBN sensor 820 is used.

An RGB sensor 810 having a general Bayer pattern performs color processing on an input signal; however, the RGBN sensor 820 used in an exemplary embodiment receives an NIR band (830) as an input signal, and thus, a dynamic range of the input signal is damaged. In other words, when an image is captured using the same shutter speed and an iris diaphragm, an image of the RGBN sensor 820 without the IRCF used in the present embodiment is darker than an image of the RGB sensor having a general Bayer pattern.

Figure 9:
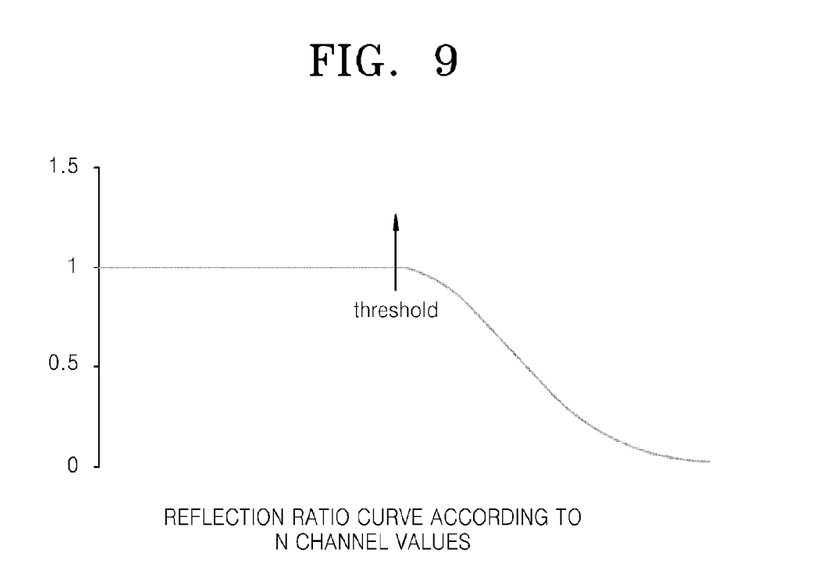
FIG. 9 illustrates an example of an optical saturation curve according to an exemplary embodiment.

To address this problem, in an exemplary embodiment, color restoration of a region that approaches light saturation is suppressed by applying a weight curve of FIG. 9 to a color restoration process. In Equation 9, a threshold value is set as shown in Equation 13 below:

$$\text{threshold} = \text{MAX}(N_{i,j}^{input}) * 0.7 \quad (13),$$

where $N_{i,j}^{input}$ is a pixel value of an NIR image.

A light saturation curve is set as shown in Equation 14:

$$\text{curve} = e^{\frac{4 \times (x - threshold)^2}{normal^2}} \quad (14)$$

where x is an input value that comes into an N pixel, and normal is a constant that is a normalized term.

In the current embodiment, color restoration considering a light saturation phenomenon is performed by using Equations 13 and 14 so that an NIR removing ratio in a saturation region may be reduced and restoration to natural color that is associated with the peripheral environment may be performed.

Figure 10:
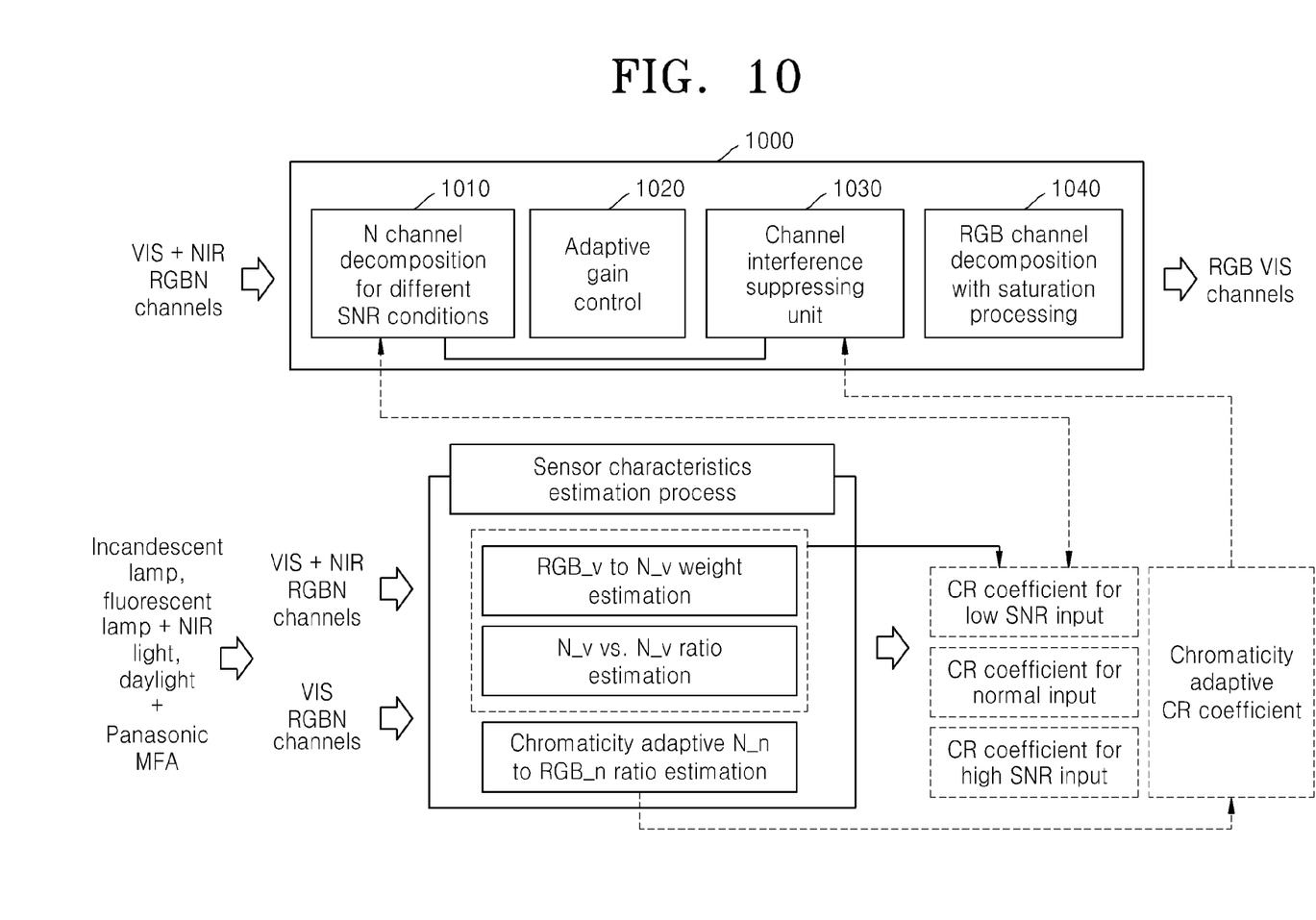
FIG. 10 illustrates an example of an internal structure of a color restoration apparatus according to an exemplary embodiment.

FIG. 10 illustrates an example of an internal structure of a color restoration apparatus 1000 according to an exemplary embodiment. The color restoration apparatus 1000 includes an N channel decomposition unit 1010 for different SNR conditions, an adaptive gain control unit 1020, a channel interference suppressing unit 1030 and an RGB channel decomposition unit 1040 with saturation processing.

A channel $N_{all}$ is separated from an all band input image including a visible light band and an invisible light band at the N channel decomposition unit 1010. In this case, according to an exemplary embodiment, due to a physical limitation of the channel $N_{all}$ (see 210 of FIG. 2B), mixed spectrum information is separated (see Equations 4, 5, 9, and 10 through 12). To this end, a correlation between a color channel and an NIR channel shown in Equation 9 is used. Adaptive chromaticity coefficients $\alpha_r(c)$, $\alpha_g(c)$, and $\alpha_b(c)$ that are used in Equation 9 are calculated by the channel interference suppressing unit 1030.

NIR band information $N\hat{}_{NIR}$ is separated from the channel $N_{all}$ by using the AGC unit 1020 based on Equations 10 through 12.

NIR band information $R\hat{}_{nir}$, $G\hat{}_{nir}$, and $B\hat{}_{nir}$ is estimated from R, G, and B channels based on the separated information $N\hat{}_{NIR}$ at the RGB channel decomposition unit 1040 (see FIGS. 3 and 4).

As described above, visible light band images $R_{vis}$, $G_{vis}$, and $B_{vis}$ are restored from all band images $R_{all}$, $G_{all}$, $B_{all}$, and $N_{all}$ including the visible light band and the invisible light band at the RGB channel decomposition unit 1040. According to an exemplary embodiment, color may be restored in further consideration of the light saturation phenomenon, as shown in Equations 13 and 14.

Figure 11:
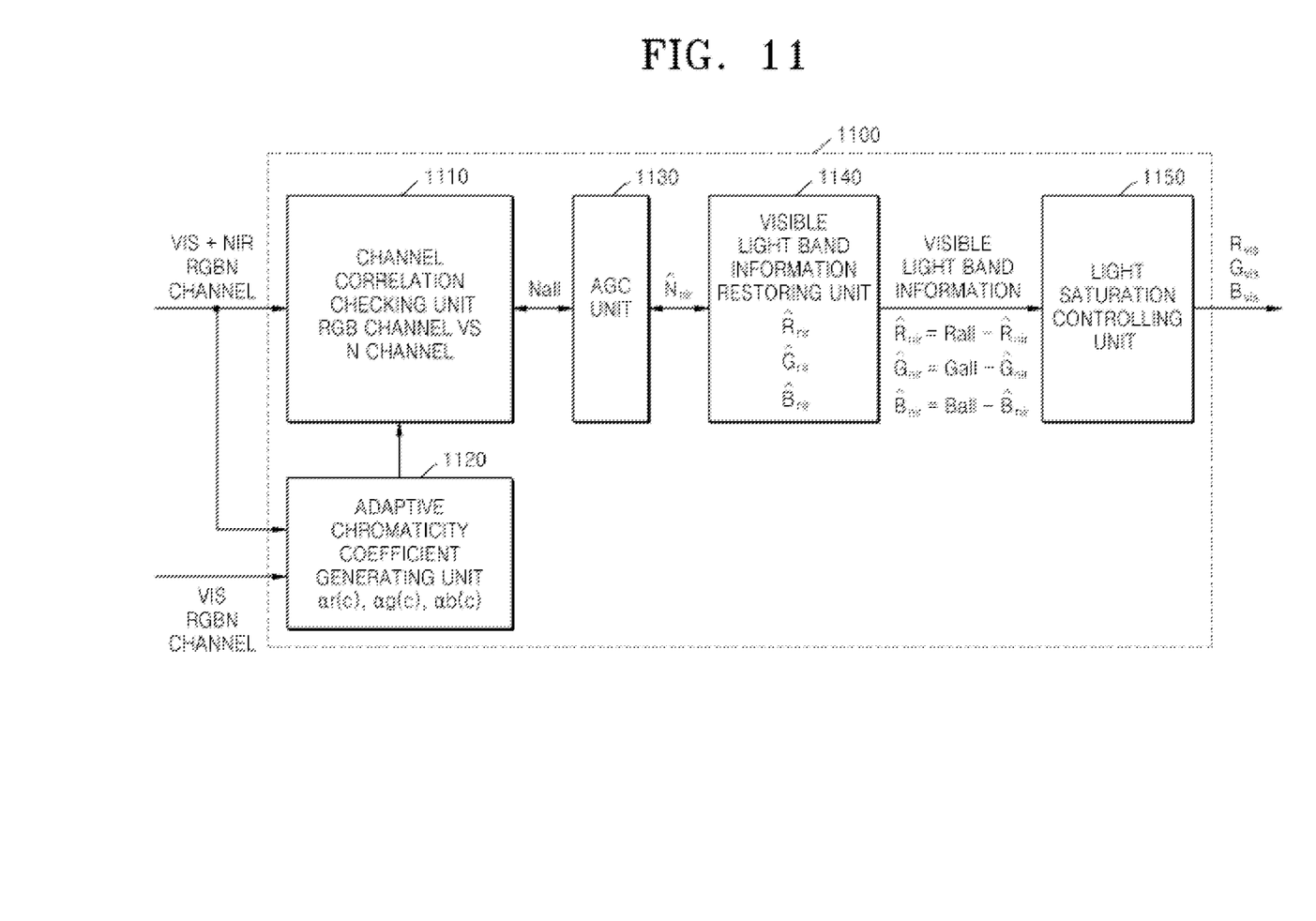
FIG. 11 illustrates an internal structure of a color restoration apparatus according to another exemplary embodiment.

FIG. 11 illustrates an internal structure of a color restoration apparatus 1100 according to another exemplary embodiment.

Referring to FIG. 11, the color restoration apparatus 1100 includes a channel correlation checking unit 1110, an adaptive chromaticity coefficient generating unit 1120, an AGC unit 1130, a visible light band information restoring unit 1140, and a light saturation controlling unit 1150.

The channel correlation checking unit 1110 checks a correlation between R, G, and B channels and an N channel, as shown in Equation 9, in consideration of adaptive chromaticity coefficients $\alpha_r(c)$, $\alpha_g(c)$, and $\alpha_b(c)$ and an actual noise level. Here, the chromaticity coefficients $\alpha_r(c)$, $\alpha_g(c)$, and $\alpha_b(c)$ are generated by the adaptive chromaticity coefficient generating unit 1120 based on a k-means clustering method by which a difference between information (for example, $R_{vis}$) in an actual visible light band and information $R\hat{}_{vis}$ in an estimated visible light band is the smallest.

The channel correlation checking unit 1110 separates $N_{all}$ from $R_{all}$, $G_{all}$, $B_{all}$, and $N_{all}$ based on the checked correlation. The AGC unit 1130 separates NIR band information $N\hat{}_{NIR}$ from $N_{all}$ by using Equations 10 through 12.

The visible light band information restoring unit 1140 estimates $R\hat{}_{nir}$, $G\hat{}_{nir}$, and $B\hat{}_{nir}$ based on information $N\hat{}_{nir}$ separated by the AGC unit 1130. Thereafter, the estimated invisible light band information $R\hat{}_{nir}$, $G\hat{}_{nir}$, and $B\hat{}_{nir}$ are removed from color channel all band information $R_{all}$, $G_{all}$, and $B_{all}$ to restore visible light band images $R_{vis}$, $G_{vis}$, and $B_{vis}$.

In an exemplary embodiment, the light saturation controlling unit 1150 performs light saturation compensation on the restored visible light band images by using Equations 13 and 14.

The above embodiments can also be embodied in computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the exemplary embodiments can be easily construed by programmers skilled in the art to which the inventive concept pertains.

As described above, according to the exemplary embodiments, a color deterioration phenomenon that occurs when visible light band information and NIR band information are mixed with each other in an image acquisition process can be suppressed.

According to an exemplary embodiment, color of an image is stepwise restored by using a color restoration method so that a similar result to the case where a physical filter is used can be obtained.

Also, according to an exemplary embodiment, by using an AGC unit, details of the image information can be improved in a color restoration process.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A color restoration method comprising:
separating multiple band information of a near infrared (NIR) channel from information of an input image by using variables indicating a correlation between a color channel and the NIR channel in the input image;
obtaining estimated invisible light band information of the NIR channel from the multiple band information of the NIR channel and estimated multiple band information of the NIR channel which is estimated from the color channel;
estimating invisible light band information of the color channel based on the estimated invisible light band information of the NIR channel; and
restoring a visible light band image of the color channel by removing the estimated invisible light band information of the color channel from multiple band information of the color channel included in the information of the input image.

2. The color restoration method of claim 1, further comprising calculating a difference between visible light band information and estimated visible light band information of an input image,
wherein the separating the multiple band information of the NIR channel from the input image is performed based on a case in which the difference is the smallest.

3. The color restoration method of claim 2, further comprising
obtaining adaptive chromaticity coefficients for the case in which the difference is the smallest; and
suppressing interference between the color channel and the NIR channel using the adaptive chromaticity coefficients.

4. The color restoration method of claim 2, wherein the obtaining the estimated invisible light band information of the NIR channel is performed by determining and removing noise of the multiple band information of the NIR channel.

5. The color restoration method of claim 4, wherein the noise is determined by obtaining a difference between the multiple band information of the NIR channel and a value obtained by multiplying the estimated multiple band information of the NIR channel by a value which is greater than 0 and smaller than 1.

6. The color restoration method of claim 1, wherein the multiple band information of the color channel comprises visible light band information and invisible light band information of the color channel, and
wherein the multiple band information of the NIR channel comprises visible light information and invisible light information of the NIR channel.

7. The color restoration method of claim 1, wherein the estimated invisible light band information of the NIR channel is obtained by using an equation $\lambda K(N_{all} - r\hat{N}_{all}) = \hat{N}_{nir}$,
wherein $$\lambda = \frac{\frac{1}{r} \times \hat{N}_{nir}}{\left(\frac{1}{r} - 1\right) \times N_{all} \times K + \hat{N}_{nir}},$$

and
wherein $N_{all}$ is the multiple band information of the NIR channel, $\hat{N}_{all}$ is the estimated multiple band information estimated from the color channel, and r is a constant greater than 0 and smaller than 1, and K is another constant.

8. The color restoration method of claim 1, further comprising suppressing color restoration in a region that exceeds a threshold value by applying a following weight curve to the NIR channel to perform light saturation compensation, $$\text{curve} = e^{\frac{4 \times (x - threshold)^2}{normal^2}},$$

wherein x is a pixel value of an NIR image, normal is a constant that is a normalized term, threshold = MAX($N^{i,j\,input}$)*0.7 and $N^{i,j\,input}$ is a pixel value of the NIR image.

9. The color restoration method of claim 1, further comprising performing light saturation compensation on the NIR channel in the restored visible light band image.

10. A color restoration apparatus comprising:
a channel correlation checking unit configured to separate multiple band information of a near infrared (NIR) channel from information of an input image by using variables indicating a correlation between a color channel and the NIR channel in the input image;
an adaptive gain control (AGC) unit configured to obtain estimated invisible light band information of the NIR channel from the multiple band information of the NIR channel and estimated multiple band information of the NIR channel which is estimated from the color channel; and
a visible light band information restoring unit configured to estimate invisible light band information of the color channel based on the estimated invisible light band information of the NIR channel, and restore a visible light band image of the color channel by removing the estimated invisible light band information of the color channel from multiple band information of the color channel included in the information of the input image.

11. The color restoration apparatus of claim 10, further comprising an adaptive chromaticity coefficient generating unit configured to calculate a difference between visible light band information and estimated visible light band information of an input image, wherein the channel correlation checking unit is configured to separate the multiple band information of the NIR channel from the input image based on a case in which the difference is the smallest.

12. The color restoration apparatus of claim 11, wherein the adaptive chromaticity coefficient generating unit is configured to obtain adaptive chromaticity coefficients for the case in which the difference is the smallest, and suppress interference between the color channel and the NIR channel using the adaptive chromaticity coefficients.

13. The color restoration apparatus of claim 11, wherein the AGC unit is configured to obtain the estimated invisible light band information of the NIR channel by determining and removing noise of the multiple band information of the NIR channel.

14. The color restoration apparatus of claim 13, wherein the AGC unit is configured to determine the noise by obtaining a difference between the multiple band information of the NIR channel and a value obtained by multiplying the estimated multiple band information of the NIR channel by a value which is greater than 0 and smaller than 1.

15. The color restoration apparatus of claim 10, wherein the multiple band information of the color channel comprises visible light band information and invisible light band information of the color channel, and
wherein the multiple band information of the NIR channel comprises visible light information and invisible light information of the NIR channel.

16. The color restoration apparatus of claim 10, wherein the AGC unit is configured to obtain the invisible light band information of the NIR channel by using an equation $\lambda K(N_{all} - r\hat{N}_{all}) = \hat{N}_{nir}$, wherein $$\lambda = \frac{\frac{1}{r} \times \hat{N}_{nir}}{\left(\frac{1}{r} - 1\right) \times N_{all} \times K + \hat{N}_{nir}},$$

and
wherein $N_{all}$ is the multiple band information of the NIR channel, $\hat{N}_{all}$ is the estimated multiple band information estimated from the color channel, and r is a constant greater than 0 and smaller than 1, and K is another constant.

17. The color restoration apparatus of claim 10, further comprising a light saturation controlling unit configured to suppress color restoration in a region that exceeds a threshold value by applying a following weight curve to the NIR channel to perform light saturation compensation, $$\text{curve} = e^{\frac{4 \times (x - threshold)^2}{normal^2}}$$

wherein x is a pixel value of an NIR image, normal is a constant that is a normalized term, threshold = $\text{MAX}(N_{i,j}^{input}) \ast 0.7$ and $N_{i,j}^{input}$ a pixel value of the NIR image.

18. The color restoration apparatus of claim 10, further comprising a light saturation controlling unit configured to perform light saturation compensation on the NIR channel in the restored visible light band image.

* * * * *